US012592249B2

(12) United States Patent
Wessel et al.

(10) Patent No.: US 12,592,249 B2
(45) Date of Patent: Mar. 31, 2026

(54) HEAT ASSISTED MAGNETIC RECORDING WRITER HAVING A NOTCHED WRITE POLE

(71) Applicant: SEAGATE TECHNOLOGY LLC, Fremont, CA (US)

(72) Inventors: James G. Wessel, Savage, MN (US); Manish Kapoor, Minneapolis, MN (US); Jianhua Xue, Maple Grove, MN (US)

(73) Assignee: Seagate Technology LLC, Fremont, CA (US)

( * ) Notice: Subject to any disclaimer, the term of this patent is extended or adjusted under 35 U.S.C. 154(b) by 106 days.

(21) Appl. No.: 18/436,496

(22) Filed: Feb. 8, 2024

(65) Prior Publication Data

US 2024/0331724 A1     Oct. 3, 2024

Related U.S. Application Data

(60) Provisional application No. 63/493,437, filed on Mar. 31, 2023.

(51) Int. Cl.
*G11B 5/187*      (2006.01)
*G11B 5/00*       (2006.01)

(52) U.S. Cl.
CPC ...... *G11B 5/187* (2013.01); *G11B 2005/0021* (2013.01); *G11B 2209/02* (2013.01)

(58) Field of Classification Search
CPC ............ G11B 5/187; G11B 2005/0021; G11B 2209/02; G11B 5/3116
See application file for complete search history.

(56) References Cited

U.S. PATENT DOCUMENTS

| | | | |
|---|---|---|---|
| 8,351,305 B2 | 1/2013 | Zhou | |
| 2005/0068671 A1* | 3/2005 | Hsu ...................... | G11B 5/3146 |
| | | | 360/125.22 |
| 2011/0007428 A1* | 1/2011 | Batra .................... | G11B 5/3116 |

\* cited by examiner

*Primary Examiner* — Andrew Sasinowski
(74) *Attorney, Agent, or Firm* — Mueting Raasch Group

(57)     ABSTRACT

Described is a recording head that includes a notched write pole to enhance perpendicularity of the write pole field. The write pole notch is formed at the media-facing surface and the leading edge of the write pole. The write pole notch is filled with a non-magnetic metal. The recording head further includes a near field transducer located in front of the leading edge of the write pole and having a portion extending to the media-facing surface that is spaced apart from the notch, thereby forming a gap between the near field transducer and the notch.

20 Claims, 8 Drawing Sheets

HEAT ASSISTED MAGNETIC RECORDING WRITER HAVING A NOTCHED WRITE POLE

RELATED APPLICATIONS

This application claims the benefit of U.S. Provisional Patent Application No. 63/493,437, filed on Mar. 31, 2023, which provisional patent application is incorporated herein by reference in its entirety to the extent that it does not conflict with the disclosure presented herein.

TECHNICAL FIELD

The disclosure relates to notched write poles for use in heat assisted magnetic recording.

SUMMARY

In accordance with certain aspects, the present disclosure describes a recording head that includes a write pole extending to a media-facing surface and having a leading edge and a trailing edge relative to movement of a storage media in a down-track direction, and a notch extending into the write pole from the leading edge, the notch being filled with a non-magnetic metal. In various embodiments, the recording head further includes a near field transducer located in front of the leading edge of the write pole and having a portion extending to the media-facing surface, said portion being spaced apart from the notch in the down-track direction, thereby forming a gap between the near field transducer and the notch, the gap being filled with an insulating material that is different from a material filling the notch.

In certain aspects, the non-magnetic material filling the notch is a refractory metal. In certain aspects, the non-magnetic material filling the notch is gold, copper, iridium, platinum, rhodium, ruthenium, or tungsten.

In certain aspects, the notch has a length greater than zero measured at the media-facing surface in the down-track direction, a width greater than zero measured at the media-facing surface in a cross-track direction perpendicular to the down-track direction, and a height greater than zero measured a z-direction perpendicular to the media-facing surface. In certain embodiments, the notch length is about 25 nm or more and the notch height is less than about 35 nm. In certain embodiments, the notch length notch length is about 40 nm or more and the notch height is about 17 nm to about 26 nm.

In certain aspects, the notch has a shape that is rectangular, elliptical, or arcuate.

In certain aspects, the distance from the notch to the portion of the near field transducer extending to the media-facing surface is between about 10 nm and about 50 nm. In certain aspects, the distance from the notch to the portion of the near field transducer extending to the media-facing surface is between about 20 nm and about 35 nm.

In certain aspects, the insulating material filling the gap between the notch and the near field transducer is alumina.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

The present disclosure relates to magnetic recording using a write pole to apply a magnetic field that changes the magnetic orientation of bits on a magnetic recording medium. In particular, the present disclosure relates magnetic recording utilizing a near field transducer positioned proximate to the write pole to aid in the magnetic writing process. A near field transducer (also referred to herein as NFT) is in essence a nanoscale "antenna" for directing plasmons at the media surface, often employed in heat assisted magnetic recording (HAMR). HAMR refers to the concept of locally heating the recording media to reduce the coercivity, thereby allowing the applied magnetic field to more easily direct the magnetization of the media during temporary magnetic softening. This can allow for the use of small grain media with a larger magnetic anisotropy at room temperature to thereby enhance thermal stability, which is desirable for recording at increased areal densities. HAMR can be applied to any type of magnetic storage media, including granular and patterned media. By heating the media, the coercivity is reduced such that the magnetic write field is sufficient to write to the media. Once the media cools to ambient temperature, the coercivity has a sufficiently high value to assure thermal stability of the recorded information.

Figure 5:
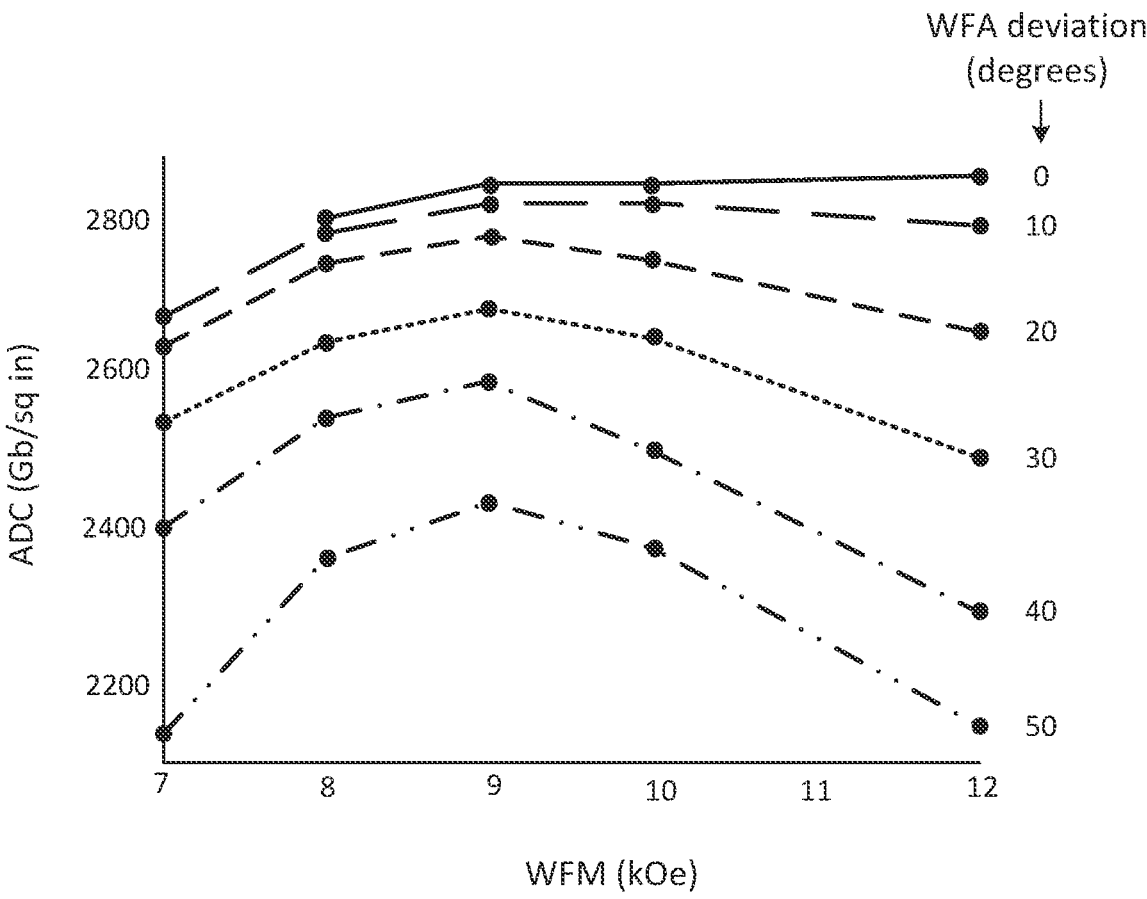
FIG. 5 is a graph indicating the dependence of areal density capability (ADC) on the write field angle deviation from perpendicular relative to the media surface as a function of write field magnitude.

One of the factors that contributes to performance in HAMR is the angle of the write field with respect to the media. In some examples, it is preferred that the field angle with respect to the media is perpendicular or very nearly perpendicular. As the field angle deviates from perpendicular with respect to the media, performance may degrade. Conversely, as the angle of the write field approaches perpendicular, areal density capability (ADC) may increase. As discussed in more detail elsewhere in the present disclosure, FIG. 5 illustrates the relationship between the write field angle deviation from perpendicular and ADC. As write field angle deviation decreases (that is, becomes more perpendicular to the media), ADC increases. This effect becomes more pronounced at higher write field magnitudes.

In accordance with the present disclosure, the presence of a notch in the write pole at its leading edge can increase the perpendicularity of the write field angle, thus creating conditions conducive for the improvement of ADC. In certain aspects, the potential improvement to ADC can be affected by adjusting the dimensions of the notch, particularly the length of the notch in the down-track direction and the height of the notch in a direction perpendicular to the media-facing surface. In certain aspects, the potential improvement to ADC can be affected by adjusting a spacing between the notch and a near field transducer positioned in front of the leading edge of the write pole. In certain aspects, the notch may be filled with a non-magnetic metal material, preferably a refractory metal.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements. Likewise, the use of charts is meant to elucidate selected behaviors (whether physical, electrical, optical, chemical, etc.) without being bound to exactitude or to any theory.

Figure 1:
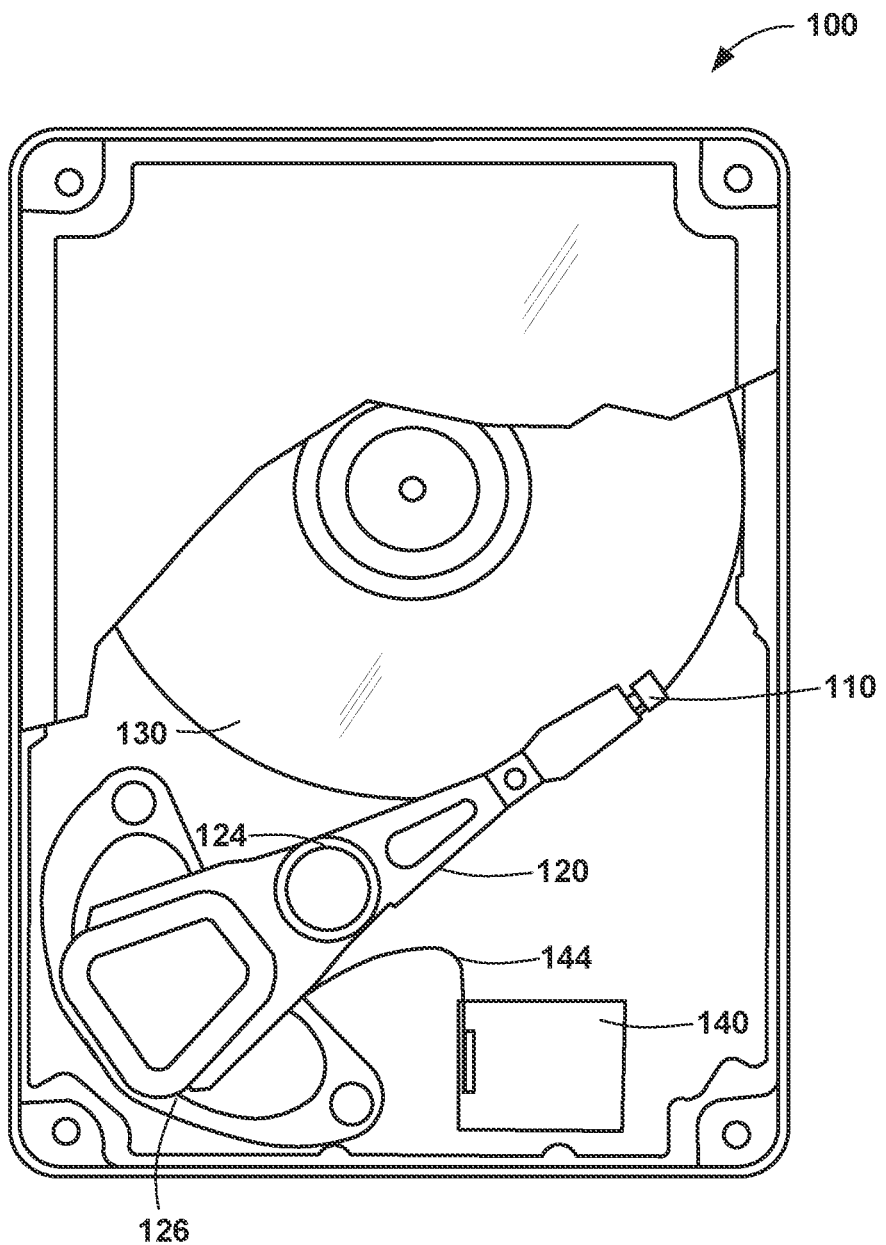
FIG. 1 is a schematic illustration of a hard disk drive as may be employed in various aspects of the present disclosure.

FIG. 1 is a schematic view of hard disk drive 100 including an actuation system for positioning slider 110 over tracks of magnetic media 130. Embodiments of the present disclosure may be used with various disk drive configurations, and the particular configuration of disk drive 100 shown is illustrative and not limiting. Disk drive 100 includes voice coil motor 126 arranged to rotate actuator arm 120 on a spindle axis 124. Magnetic media 130 rotates under slider 110, which is kept aloft a small distance above the surface of magnetic media 110. Magnetic media 130 is formatted with an array of data storage cells for storing data. Slider 110 carries a magnetic transducer (not shown in FIG. 1) for reading and/or writing data onto tracks on magnetic media 130. In HAMR drives, the magnetic transducer utilizes additional electromagnetic energy to heat the surface of media 130 to facilitate recording. In accordance with the present disclosure, a HAMR transducer includes a magnetic writer for generating a magnetic field to write to a magnetic media, and a near field transducer that can be activated by electromagnetic energy to generate plasmons that are directed toward the magnetic media proximate to the write field to assist in the writing process. Disk drive 100 may include a sealed enclosure and be filled primarily with an inert gas, such as helium.

Figure 2A:
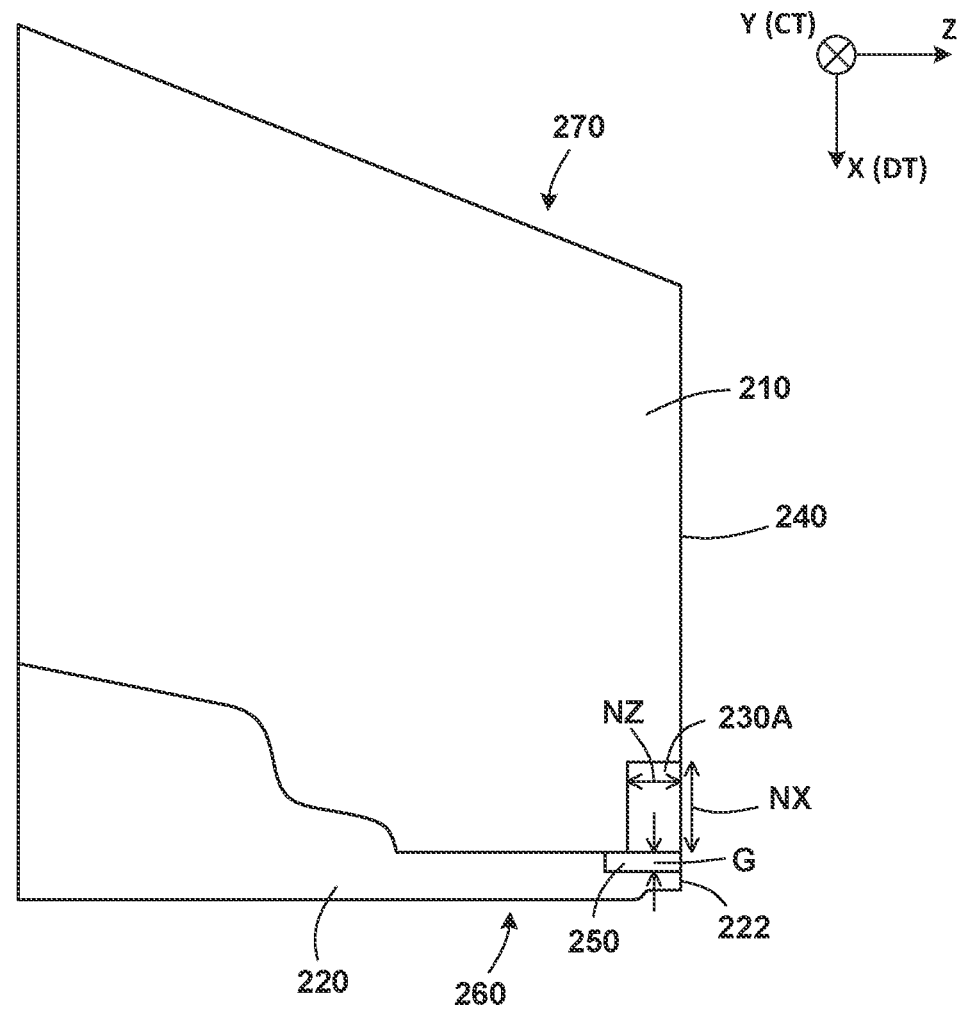
FIG. 2A is a schematic side view of elements of a recording head including a notched write pole in accordance with aspects of the present disclosure.

FIG. 2A shows a schematic side view of a write pole 210 and near field transducer (NFT) 220, where the write pole 210 includes a notch 230A at the media-facing surface 240 (also referred to herein as the air bearing surface). By convention and as indicated by the axes in the upper right of FIG. 2A, the down-track (DT) direction is vertically down the page and defined as the x-axis, the cross-track (CT) direction is into and out of the page in the plane of the media-facing surface 240 and defined as the y-axis, and the z-axis is across the page and perpendicular to the media-facing surface 240 as well as the surface of the media (not shown). In operation, the write pole 210 advances in the DT direction relative to the rotating media, thereby defining a leading edge 260 (also referred to herein as the front) and a trailing edge 270 (also referred to herein as the back).

In FIG. 2A, the write pole notch 230A is shown to have a rectangular geometry for ease of description. It will be appreciated that the exact geometry of the notch 230A may approximate a rectangular, elliptical, arcuate, or other geometry, and may be somewhat irregular at its corners, edges, or sides, as the case may be. In general, notch 230A has a length NX in the DT direction along the media-facing surface 240, a width (not shown) in the CT direction along the media-facing surface, and a height NZ measured perpendicular to the media-facing surface 240 from the media-facing surface 240 to the end of the notch 230A along the z-axis. The NFT 220 is positioned at the leading edge 260 of the write pole 210. The NFT 220 has a narrow portion 222 that extends to the media-facing surface 240. NFT portion 222 is spaced apart from the notch 230A in the DT direction by a gap G, thereby defining an interstitial space 250 between the notch 230A and the NFT 220 and NFT portion 222. The interstitial space 250 may be filled with an insulating material such as alumina.

The inclusion of notch 230A at the leading edge 260 and media-facing surface 240 of write pole 210 has been observed to increase the perpendicularity of the write field produced by the write pole. Notch 230A may be filled with any non-magnetic material, preferably a non-magnetic metal, for example a non-magnetic refractory metal. Exemplary materials for filling in the notch region include gold, copper, iridium, platinum, rhodium, ruthenium, and tungsten. In certain embodiments it may be desirable for the material filling the notch 230A to have good thermal stability when that region undergoes elevated temperature. In certain embodiments, it may be desirable for the material filling the notch 230A to have thermal properties that match or are compatible with the thermal properties of the surrounding materials, including the material of the NFT 220. Notch 230A may be formed in write pole 210 and filled by any suitable processes or patterning techniques, which may involve deposition, masking, lithography, etching, milling, polishing, and so forth.

Figure 2B:
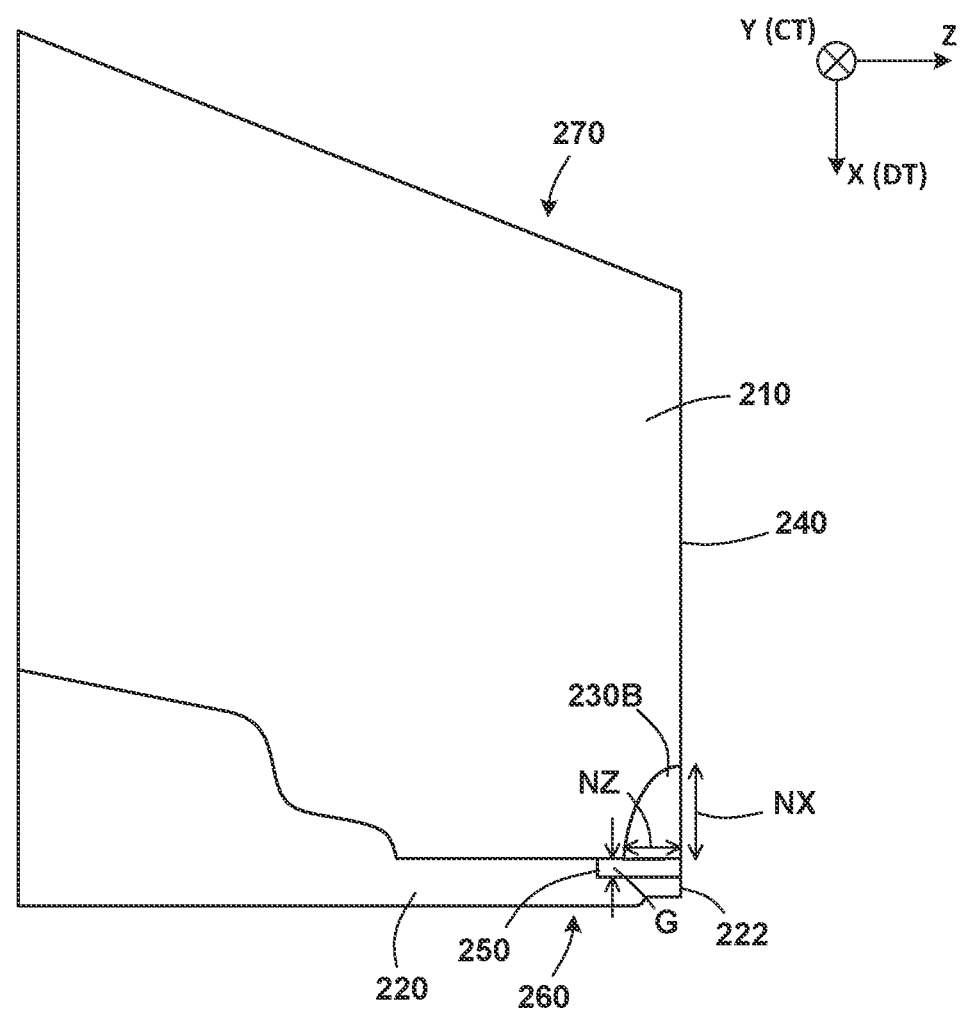
FIG. 2B is a schematic side view of elements of a recording head including a notched write pole in accordance with aspects of the present disclosure.

FIG. 2B is identical to FIG. 2A in all its elements and reference numerals, except that notch 230B is shown to have an elliptical or arcuate geometry. In such geometries, the height NZ of notch 230B can be measured from the media-facing surface 240 at a point nearest the leading edge 260. An elliptical or arcuate notch geometry may be used due to criteria such as ease of manufacturing or enhanced write field perpendicularity and may depend on the size of the notch (in particular length and height) as well as the notch material.

Figure 3:
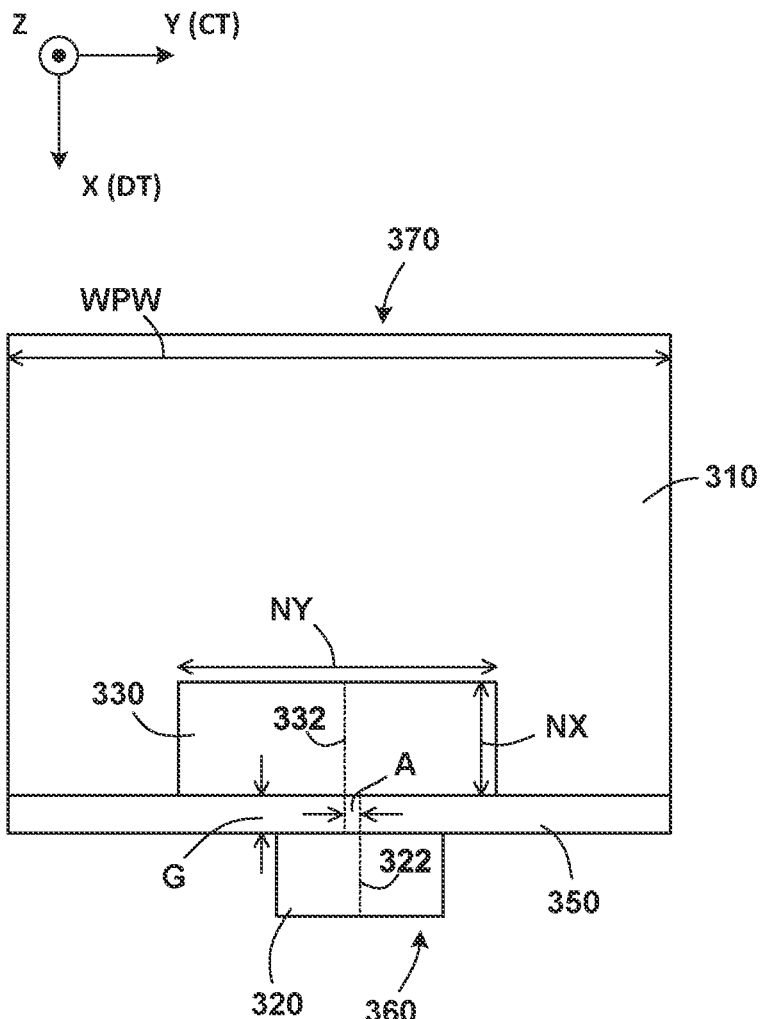
FIG. 3 is a schematic view from the media-facing surface of elements of a recording head including a notched write pole in accordance with aspects of the present disclosure.

FIG. 3 schematically shows a view of the media-facing surface of a write pole 310 having a notch 330, along with a near field transducer (NFT) 320 that is spaced apart from the notch 330 by a gap G. In this view, as indicated by the axes at the top left) the plane of the page is the media-facing surface, the DT direction (x-axis) is down the page, the CT direction (y-axis) is across the page, and the z-axis is out of the page and thus perpendicular to the media-facing surface. The write pole 310 has a trailing edge 370 and a leading edge 360, thus indicating the direction of travel of the write pole 310 with respect to the magnetic media. Notch 330 is formed in the write pole 310 at the media-facing surface and at the leading edge 360 of the write pole 310. NFT 320 is spaced a distance G from the notch 330 with an interstitial spacer 350 therebetween. Notch 330 has a length NX measured in the DT direction and a width NY measured in the CT direction. Preferably, the width NY of the notch 330 is greater than the width of the portion of the NFT 320 at the media-facing surface. In some embodiments, the notch extends across the entire write pole width WPW so that the notch width NY equals the write pole width WPW.

The alignment between notch 330 and NFT 320 can be determined by the alignment gap A between a centerline 332 of notch 330 and a centerline 322 of the portion of NFT 320 at the media-facing surface. In addition to the dimensions and materials of the notch 330, the alignment between the notch 330 and the NFT 320 can be adjusted to achieve a desired amount of write pole field perpendicularity. While alignment gap A need not be zero, in certain embodiment the alignment gap A is relatively small compared to the width NY of the notch 330.

Figure 4:
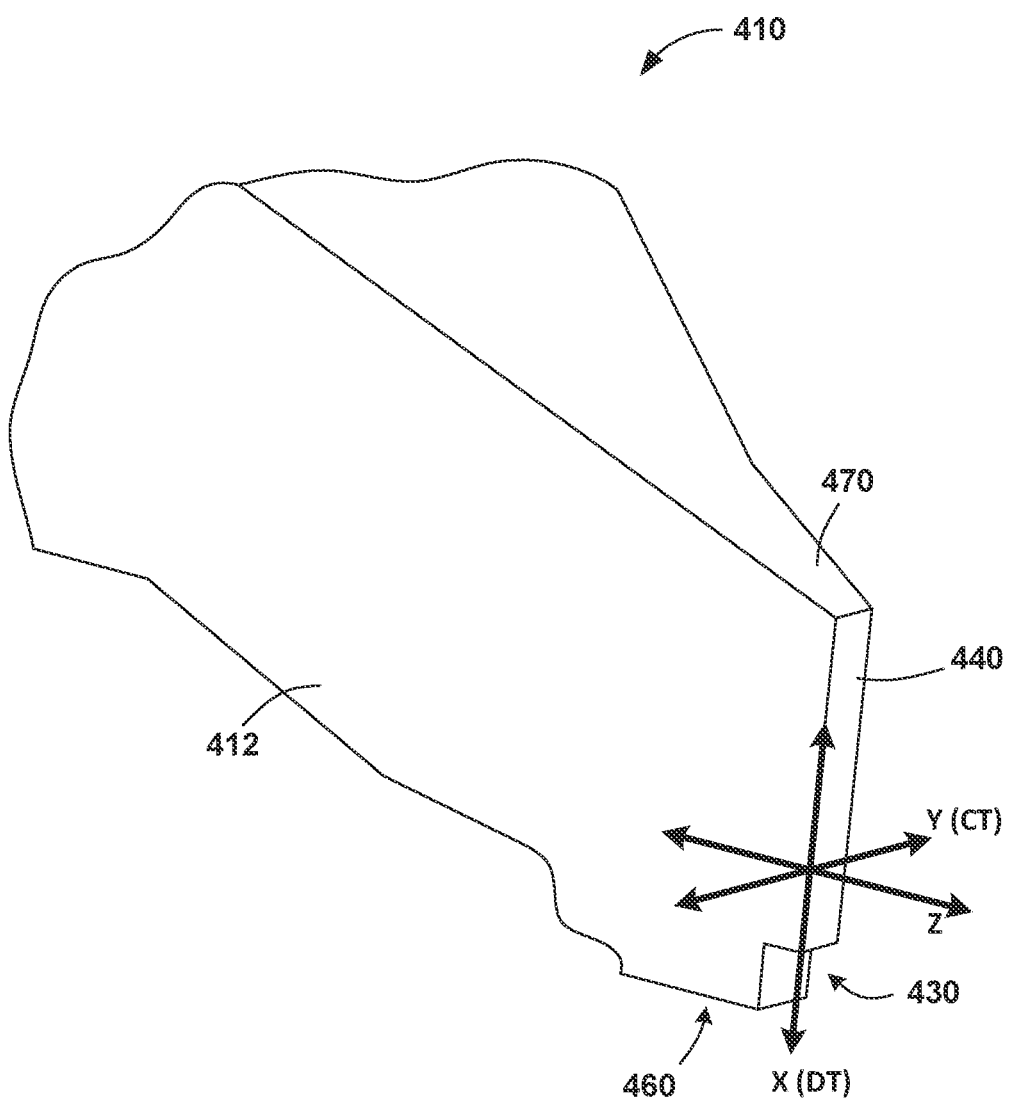
FIG. 4 is a schematic cutaway perspective view of a notched write pole in accordance with the present disclosure.

FIG. 4 shows a schematic perspective view of one half of a write pole 410, indicating the leading edge 460, the trailing edge 470, and the media-facing surface 440. Notch 430 is provided at the corner defined by the leading edge 460 and the media-facing surface 440. For purposes of illustration, the write pole 410 was cut in half at surface 412. The plane of the media-facing surface 440 includes the x-axis, which aligns with the DT direction, and the y-axis, which aligns with the CT direction. The z-axis is perpendicular to the media-facing surface 440. The alignment of the axes is the same as for FIGS. 2A and 2B, and FIG. 3, and is shown in the perspective view in FIG. 4 for sake of clarity.

FIG. 5, which was referred to previously, illustrates the relationship between the write field angle deviation from perpendicular and areal density capability (ADC). WFA deviation indicates how much the write field angle deviates from being perpendicular to the media surface. WFA deviation of 0 degrees means that the write field is perpendicular to the media surface. For WFA deviations of 10 degrees or less, the highest ADCs can be achieved with very little dependence on the write field magnitude (WFM), which in FIG. 5 is expressed in kilo-oersteds (kOe). For WFA deviations of 20 degrees or more, the achievable ADC drops off quickly with increased write field angle and depends highly on the WFM. It has been observed that the inclusion of a non-magnetic structure provided as a notch in the write pole at the corner nearest the NFT and at the air bearing surface (ABS) reduces the WFA deviation, and therefore enhances ADC.

Figure 6A:
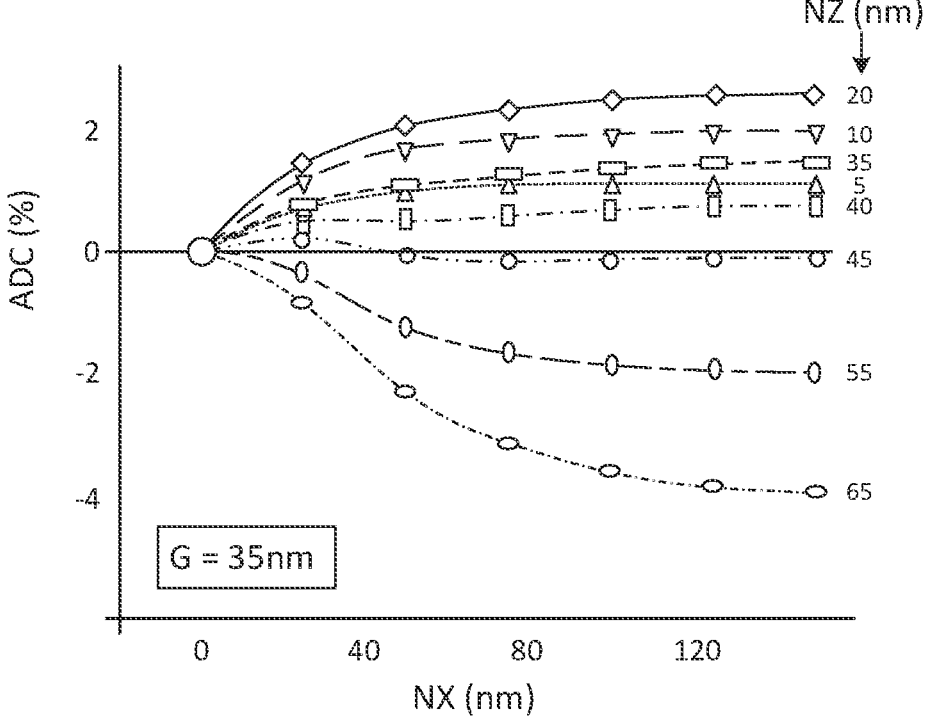
FIG. 6A is a graph indicating the percentage increase or decrease in ADC as a function of notch length (NX) and notch height (NZ) for a notched write pole with a 35 nm gap between the near field transducer and the notch.

FIG. 6A shows the percentage gain in ADC that can be achieved for a rectangular geometry write pole notch in accordance with the present disclosure as a function of the notch length NX and the notch height NZ. In reference to FIG. 2A, the curves shown in FIG. 6A are for a notch-to-NFT spacing, G, of 35 nm. FIG. 6A shows that as the notch height NZ increases from 5 nm to 20 nm, positive ADC gain can be realized for all notch lengths NX greater than zero, with the gain improvement saturating by about NX=80 nm. While not shown in FIG. 6A, the curve for NZ=25 nm was similar and slightly below the curve for NZ=20 nm, and the curve for NZ=30 nm was similar and slightly above the curve for NZ=10 nm. The curves for NZ=35 nm and NZ=40 nm also indicate positive ADC gain. At NZ=45 nm and above, the ADC gain turns negative, particularly for NX greater than about 40 nm. These results can help determine preferable size ranges for rectangular write pole notches that are spaced 35 nm from the NFT.

Figure 6B:
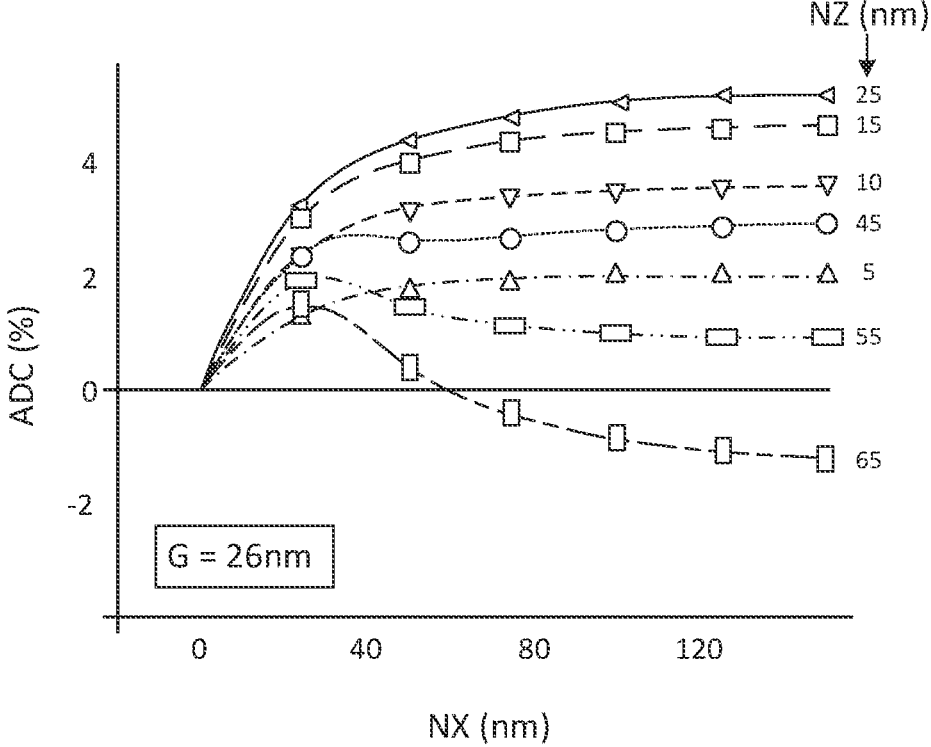
FIG. 6B is a graph indicating the percentage increase or decrease in ADC as a function of notch length (NX) and notch height (NZ) for a notched write pole with a 26 nm gap between the near field transducer and the notch.

FIG. 6B shows a set of curves similar to FIG. 6A for a rectangular write pole notch, except that in FIG. 6B the notch-to-NFT spacing, G, is 26 nm. FIG. 6B shows that as the notch height NZ increases from 5 nm 25 nm, positive ADC gain can be realized for all notch lengths NX greater than zero, with the gain improvement starting to saturate between NX=40 nm and NX=80 nm. While not shown in FIG. 6B, the curve for NZ=30 nm was similar and slightly below the curve for NZ=25 nm, and the curve for NZ=35 nm was similar and slightly below the curve for NZ=15 nm. The curves for NZ=45 nm and NZ=55 nm also indicate positive ADC gain, although the NZ=55 nm curve peaks at a lower length NX of about 25 nm to 30 nm. Similarly, the NZ=65 nm curve shows positive ADC gain initially with smaller lengths NX, but then the ADC gain turns negative at a length NX of about 55 nm to 60 nm. These results can help determine preferable size ranges for rectangular write pole notches that are spaced 26 nm from the NFT.

Similar sets of curves to those shown in FIGS. 6A and 6B can be generated for different gaps G and for different notch geometries. Taken together, these curves indicate the following ranges for rectangular and elliptical (or arcuate) notches: the NFT-to-notch gap is greater than zero and more preferably greater than 10 nm, and is less than about 50 nm, more preferably less than about 35 nm, more preferably about 26 nm or less, and more preferably about 20 nm; the notch height NZ is preferably greater than zero and less than about 50 nm, more preferably less than about 35 nm, and more preferably about 17 nm to 26 nm; and the notch length NX is preferably at least about 25 nm, more preferably at least about 40 nm, and more preferably at least about 50 nm.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A recording head comprising:
a write pole extending to a media-facing surface and having a leading edge and a trailing edge relative to movement of a storage media in a down-track direction;
a notch extending into the write pole from the leading edge, the notch being filled with a non-magnetic metal; and
a near field transducer having a portion extending to the media-facing surface that is positioned in front of and spaced a distance apart from the notch.

2. The recording head of claim 1, wherein the non-magnetic metal is a refractory metal.

3. The recording head of claim 1, wherein the non-magnetic metal is gold, copper, iridium, platinum, rhodium, ruthenium, or tungsten.

4. The recording head of claim 1, wherein the notch has a length greater than zero measured at the media-facing surface in the down-track direction, a width greater than zero measured at the media-facing surface in a cross-track direction perpendicular to the down-track direction, and a height greater than zero measured a z-direction perpendicular to the media-facing surface.

5. The recording head of claim 4, wherein the notch length is about 25 nm or more and the notch height is less than about 35 nm.

6. The recording head of claim 4, wherein the notch length is about 40 nm or more and the notch height is about 17 nm to about 26 nm.

7. The recording head of claim 1, wherein the notch is rectangular in shape.

8. The recording head of claim 1, wherein the notch is elliptical or arcuate in shape.

9. The recording head of claim 1, wherein the distance from the notch to the portion of the near field transducer extending to the media-facing surface is between about 10 nm and about 50 nm.

10. A recording head comprising:
a write pole extending to a media-facing surface and having a leading edge and a trailing edge relative to movement of a storage media in a down-track direction;
a notch extending into the write pole from the leading edge; and
a near field transducer located in front of the leading edge of the write pole and having a portion extending to the media-facing surface, said portion being spaced apart from the notch in the down-track direction, thereby forming a gap between the near field transducer and the notch, the gap being filled with an insulating material that is different from a material filling the notch.

11. The recording head of claim 10, wherein the insulating material filling the gap is alumina.

12. The recording head of claim 10, wherein the notch is spaced apart from the portion of the near field transducer extending to the media-facing surface by a distance of about 10 nm to about 50 nm.

13. The recording head of claim 10, wherein the notch is spaced apart from the portion of the near field transducer extending to the media-facing surface by a distance of about 20 nm to about 35 nm.

14. The recording head of claim 11, wherein the notch is filled with a non-magnetic material.

15. The recording head of claim 14, wherein the non-magnetic material is a refractory metal.

16. The recording head of claim 14, wherein the non-magnetic material is gold, copper, iridium, platinum, rhodium, ruthenium, or tungsten.

17. The recording head of claim 10, wherein the notch extends in the down-track direction about 40 nm or more, and the notch has a height extending perpendicular to the media-facing surface by less than about 35 nm.

18. The recording head of claim 10, wherein the notch extends in the down-track direction about 40 nm or more, and the notch has a height extending perpendicular to the media-facing surface by about 17 nm to about 26 nm.

19. The recording head of claim 11, wherein the notch has a shape that is rectangular, elliptical, or arcuate.

20. A recording head comprising:
a write pole extending to a media-facing surface and having a leading edge and a trailing edge relative to movement of a storage media in a down-track direction; and
a notch extending into the write pole from the leading edge, the notch being filled with a non-magnetic metal, wherein the notch is elliptical or arcuate in shape.

* * * * *